March 14, 1967     H. W. WHITE     3,309,163
SYNCHRONIZED MOTION PICTURE AND SLIDE PROJECTOR SYSTEM
Filed March 13, 1964     3 Sheets-Sheet 1
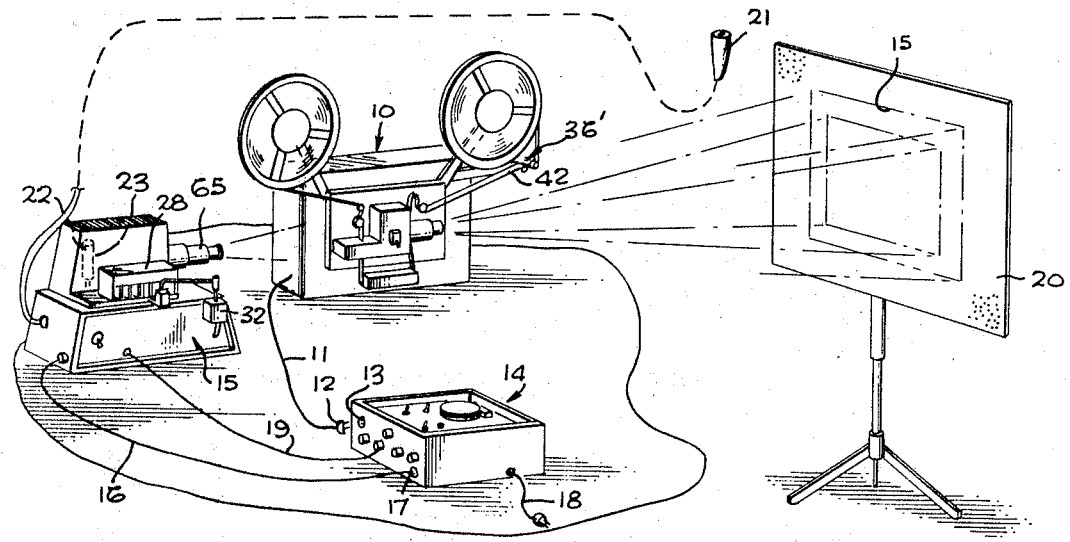
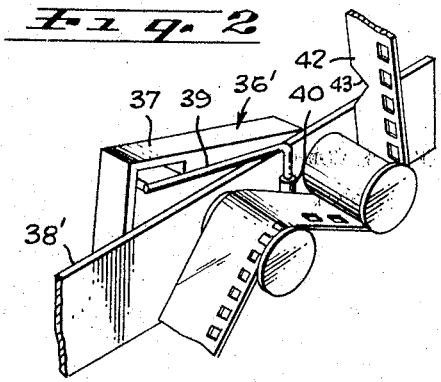
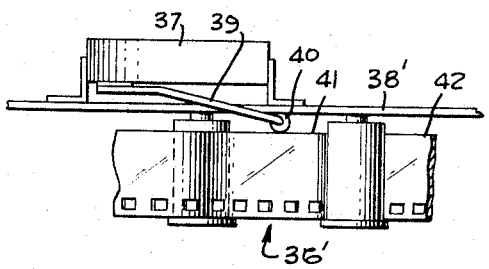
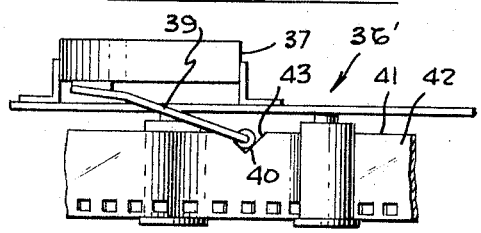
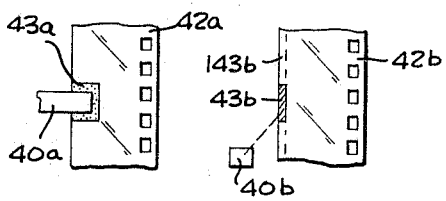
HARRY WARREN WHITE
INVENTOR.
BY *William P. Green*
ATTORNEY March 14, 1967 H. W. WHITE 3,309,163
SYNCHRONIZED MOTION PICTURE AND SLIDE PROJECTOR SYSTEM
Filed March 13, 1964 3 Sheets-Sheet 2
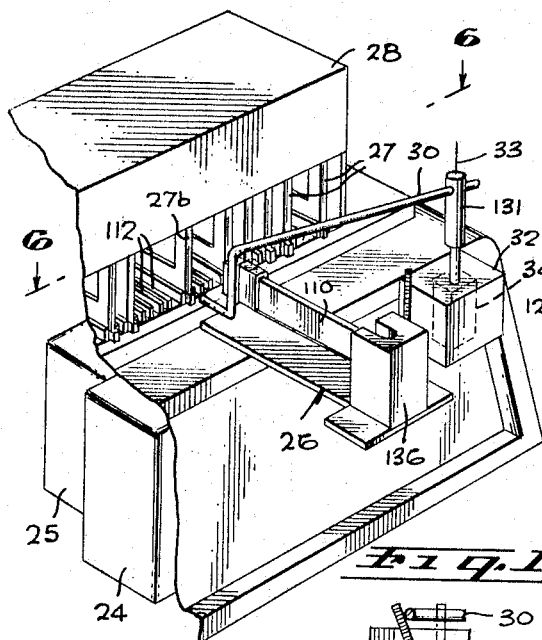
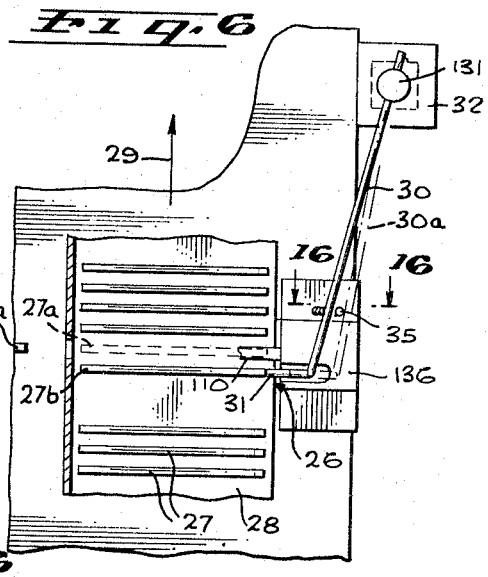
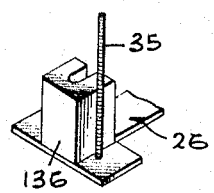
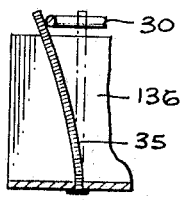
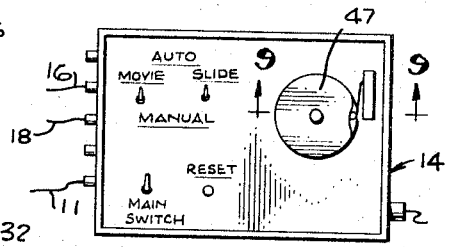
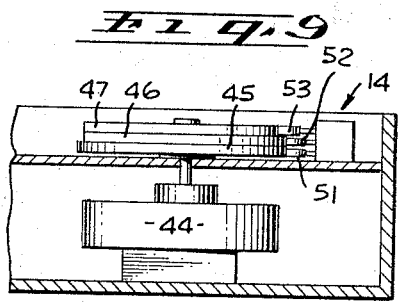
HARRY WARREN WHITE
INVENTOR.
BY William P. Green
ATTORNEY March 14, 1967 H. W. WHITE 3,309,163
SYNCHRONIZED MOTION PICTURE AND SLIDE PROJECTOR SYSTEM
Filed March 13, 1964 3 Sheets-Sheet 3
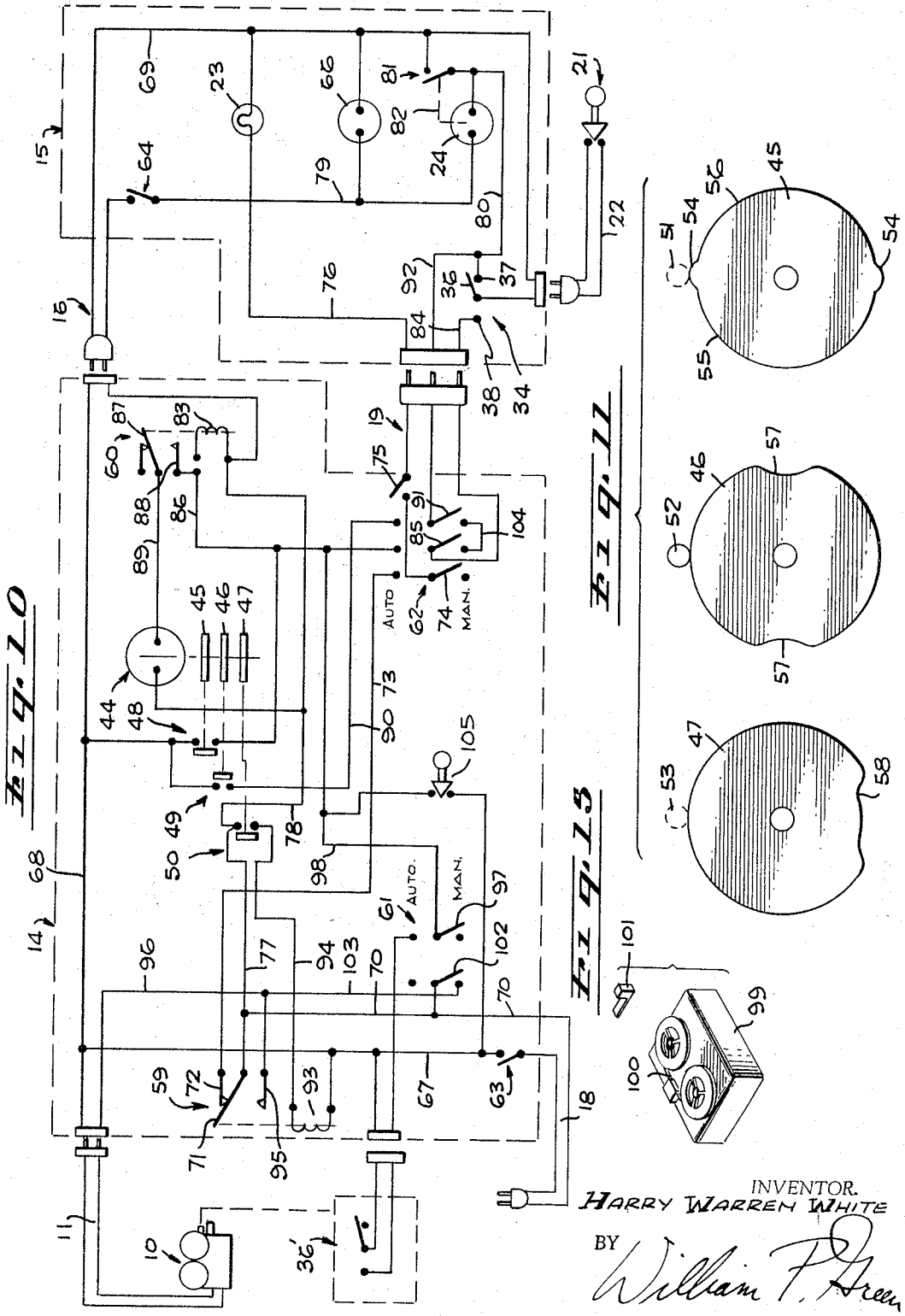
INVENTOR.
HARRY WARREN WHITE
BY William P. Green
ATTORNEY United States Patent Office 3,309,163
Patented Mar. 14, 1967

3,309,163
SYNCHRONIZED MOTION PICTURE AND SLIDE
PROJECTOR SYSTEM
Harry Warren White, 715 Wilson Court,
Burbank, Calif. 91501
Filed Mar. 13, 1964, Ser. No. 351,663
17 Claims. (Cl. 352—131)

This invention relates to an improved type of projection system, for projecting both slides and motion picture sequences onto a screen in a predetermined pattern.

In using audio visual aids for instructional or other purposes, it sometimes becomes desirable to compose a presentation partially of slides and partially of motion picture sequences, in a manner achieving an overall result or effect on the audience which could not be attained if only slides or only motion pictures were employed without the other. This is true because some types of subjects lend themselves better to illustration by slides, which can be left on the screen for a relatively extended and easily controllable length of time, while other subjects require motion picture presentation.

The general object of the present invention is to provide a unique type of apparatus which is especially adapted for presenting such a partially motion picture and partially still series of pictures, with the slides and motion pictures being interspersed in any predetermined complex pattern which may be desired. As will appear my apparatus utilizes slide projection and motion picture projection equipment which is controlled by a common interlocking control system. Desirably, the entire apparatus is controlled by an operator who may stand at a location remote from the projector apparatus itself, and typically near the projection screen to point out and discuss objects which appear thereon, but with the operator at that location being capable of remotely determining when the apparatus shifts from one slide to the next successive slide or motion picture sequence. For example, the operator may have a simple push-button control at this remote location, and after each slide may actuate the remote control to shift to the next picture to be shown, but with the apparatus itself functioning to determine automatically which type of picture will be selected. Alternatively, other means may be provided for shifting between successive pictures, as by automatic response to an inaudible signal applied to the magnetic tape of a tape recorder, which is narrating the series of projected pictures.

The different motion picture sequences may be successive portions of a single reel of film, with the apparatus being designed to automatically stop the motion picture projection system after each of the individual sequences, and until the proper time arrives for showing of the next sequence. To thus stop the motion picture projector, and preferably also automatically commence operation of the slide projector for viewing of the next slide, I may form on the motion picture film a series of indicia for causing the desired automatic response of the projector when a predetermined point on the film is reached. More specifically, these indicia may be notches formed on the edge of the film, and to which a microswitch is responsive, or magnetic areas or the like for actuating a switch in some other manner.

The slides which form a portion of a particular showing may be carried by a slide holder, with vacant spaces being left in the slide holder at the locations at which motion picture sequences are to be shown. Thus, when the apparatus reaches one of these possible slide positions at which no slide is present, the apparatus may respond to such absence of a slide by shifting the apparatus to a condition for showing a motion picture sequence.

The above and other features and objects of the invention will be better understood from the following detailed description of the typical embodiments illustrated in the accompanying drawings, in which:

FIG. 1 is a somewhat schematic representation of an overall projection system constructed in accordance with the invention;

FIG. 2 is a fragmentary perspective representation of the film actuated switch of the motion picture projector;

FIG. 3 is a plan view of the switch of FIG. 2;

FIG. 4 is a view similar to FIG. 3, but showing the switch in its actuated condition;

FIG. 5 is a fragmentary perspective view of the slide projector, showing the control switch mechanism for responding to the presence or absence of a slide at a particular location in the slide holder;

FIG. 6 is a fragmentary horizontal section through the slide holder and related parts of FIG. 5, and taken on line 6—6 of FIG. 5;

FIG. 7 is a view similar to FIG. 6, but showing the condition of the apparatus during response to the absence of a slide at one location in the slide holder;

FIG. 8 is a plan view of the control unit for my apparatus;

FIG. 9 is an enlarged fragmentary vertical section taken on line 9—9 of FIG. 8;

FIG. 10 shows the circuit diagram for the apparatus;

FIG. 11 illustrates the three motor actuated timing cams of the control system;

FIG. 12 is a perspective view of the forward side of the reciprocable slide feeding member;

FIGS. 13 and 14 show two different types of indicia which may be employed on the motion picture film;

FIG. 15 represents fragmentarily a variational form of switching system for the apparatus; and FIG. 16 is taken on line 16—16 of FIG. 6.

Referring first to FIG. 1, I have represented at 10 a conventional motion picture projector which is energized by power supplied through a cord 11 having a plug 12 connectible into a socket 13 formed in the side of a control unit or box 14. Similarly, the apparatus includes a slide projector 15, also having a power cord 16 whose plug 17 is connected into unit 14 to receive power therefrom. The power is in turn supplied to control unit 14 through a cord 18 which is connectible to a conventional power source, typically 110 volts 60 cycles alternating current. A multiple conductor cable 19 also extends between the slide projector and control unit 14, to complete certain portions of the circuit of FIG. 10. The entire apparatus is under the manual control of an operator who may stand at a location remote from the projector apparatus, and typically near the screen 20 onto which both projectors can project their pictures. For this purpose, a manually actuated push-button switch 21 may be connected by a long cord 22 to the slide projector.

The slide projector 15 contains the usual projection bulb 23 (FIG. 1), a fan for cooling the bulb (not shown), and a slide change motor 24 (FIG. 5) acting through an appropriate gear unit and/or linkage arrangement diagrammatically represented at 25 in FIG. 5 to reciprocate a slide feed member 26, having the usual slide pushing and retracting arm 110. The photographic slides are illustrated at 27 in FIGS. 5, 6 and 7, and are held in parallel guideways 112 within a conventional slide holder 28 which is automatically actuated forwardly in the direction of arrow 29 of FIG. 6 through a series of successive stations for moving the different slides 27 successively into the proper position for projection. In FIG. 6, for example, it may be assumed that a slide which was initially at the feeding location or position designated in broken lines at 27a has been shifted laterally by recpirocating feed member 26 (to the left in FIG. 6) and into the interior of the slide projector to the position 127a in the path of light from lamp 23, for projection of the image of that slide onto screen 20. Upon the next cycle of operation of motor 24, this motor and its driven mechanism 25 act to first shift member 26 to the right in FIG. 6, then move slide carrier 28 forwardly through one step to a position in which the next successive slide 27b is at the broken line feeding location of FIG. 6, and then shift member 26 back to the left to move the next slide 27b into viewing position. The mechanism remains in the projection condition until the operator again actuates the remote control switch to cause feed member 26 to move through another reciprocating slide feeding cycle, first rightwardly and then leftwardly. Since all of this slide feeding mechanism is completely conventional, it has not been shown in any great detail.

To respond to the absence of a slide at any particular one of the various possible slide locations in carrier 28, and to thereby automatically start the motion picture projector whenever this condition occurs, I provide a feeler arm 30 (FIGS. 5, 6 and 7), which has an end portion 31 projecting parallel to the planes of the sides, and normally located slightly outwardly beyond the slides (see broken line position 30a slightly to the right of the full line position shown in FIG. 6) to allow movement of the slide carrier 28 without interference from arm 30. Arm 30 is carried by a shaft 131, which is mounted to a small switch housing 32 stationarily secured to the side of the slide projector housing 33. Shaft 31 is mounted to turn about an axis 33 relative to switch housing 32, and serves upon such rotary movement to actuate a switch 34 within housing 32 between two different positions. A resilient elongated spring finger 35 (FIGS. 12 and 16) may be connected at its lower end to member 26, and project upwardly alongside the upwardly projecting portion 136 of member 26, to engage arm 30 and tend to displace it inwardly between the broken line position 30a of FIG. 6 and the full line position of FIG. 7 upon each leftward actuation of member 26. The extremity 31 of arm 30 is positioned to engage the outer or right edge of a single one of the slides, specifically the next successive slide to be viewed, that is, the slide which is in the next poition rearwardly of feeding location 27a of FIG. 6. In FIG. 6, this next successive slide to be projected is designated as slide 27b. If a slide is present at this location, the engagement of extremity 31 of arm 30 with that slide prevents movement of arm 30 far enough to actuate switch 34 between its two conditions. To in this case enable full leftward movement of member 26 without corresponding full leftward movement of arm 30, the spring member 35 flexes during the final portion of the leftward movement of member 26 (see full line position of FIG. 16).

When the slide holder reaches a position in which feeler 31 is located opposite a vacant slide station, as in FIG. 7, then spring member 35 is free to move arm 30 leftwardly to the FIG. 7 position, and thereby actuate switch 34 to its second setting. Thus, the arm 30 and its associated mechanism respond to the absence or presence of a slide at the next successive location following or just rearwardly of the particular location from which a slide is actually displaced into projection position upon a particular cycle of operation of the slide projector.

In the circuit diagram of FIG. 10, the switch 34 is illustrated as a single-pole double-throw switch, having a contact arm 36 which engages a first contact 37 when arm 30 is in either the full line or broken line position (30a) of FIG. 6, and which is actuated into engagement with a second contact 38 when arm 30 is displaced to the position of FIG. 7.

Describing now the motion picture projector 10, this projector may be considered as completely conventional, except for the addition of a micro-switch 36' (FIGS. 2, 3 and 4) whose body 37 is suitably mounted stationarily to a rigid frame member 38' carried by the housing of the projector. The micro-switch has an actuating arm 39, with a feeler end 40 which is spring pressed with very light tension against the edge 41 of the motion picture film 42. The film 42 has a series of motion picture sequences printed on it, and at the end of each such sequence there is formed in the edge 41 of the film a notch 43 into which feeler arm 40 of the micro-switch is spring pressed, to automatically actuate the micro-switch from its open position to its closed position. As will appear at a later point, such operation of the micro-switch serves to stop the motion picture projector and cause one cycle of operation of the slide projector.

With reference now to FIG. 10, and particularly to the portion of that figure contained within the broken line box 14 and representing the circuit diagram of control unit 14 of FIG. 1, it is noted that this control circuit includes an electric motor 44 which, upon being triggered, rotates a series of three cams 45, 46 and 47 through one-half revolution, and then stops these cams until the next triggering energization of motor 44. The three cams 45, 46 and 47 mechanically actuate three switches 48, 49 and 50 respectively, to attain certain automatic control operations. FIG. 11 shows diagrammatically certain typical shapes which may be given to cams 45, 46 and 47; and this figure illustrates at 51, 52 and 53 three cam followers which may actuate switches 48, 49 and 50 respectively. As seen in FIG. 11, cam 45 may have two diametrically opposite lobes 54 which act to open the associated switch 48 when either of the two lobes 54 is in engagement with follower 51, but which allow spring pressed closure of switch 48 whenever follower 51 is in engagement with any other portion of the cam, as at 55 or 56. Cam 46 is externally circular except at the location of two depressions 57, which may be at diametrically opposite locations, and which are circularly between the locations of the two lobes 54 of cam 45. When follower 52 is spring pressed into engagement with the recessed portions 57 of cam 46, the associated switch 49 is closed whereas the switch is open when the follower is in engagement with any of the rest of the peripheral surface of cam 46.

Cam 47 may have a single depression 58, and be of a somewhat greater uniform diameter through the rest of its periphery, with the recess 58 being in engagement with follower 53 when one of the two lobes 54 of cam 45 is in engagement with its follower. When follower 53 is in recess 58, switch 50 is closed, and at other times during the rotation of cam 47, switch 50 is open.

The purpose of the switch 48 is to continue the rotation of motor 44 to exactly one-half of a revolution of the cams whenever the motor is energized. The purpose of switch 49 is to actuate the slide changing mechanism of the slide projector through one cycle upon each half revolution of the cams. The purpose of switch 50 is to make a selection as between energization of the slide projector bulb and the motion picture projecting unit, with this selection being dependent upon which of two possible rotary settings (offset 180 degrees from one another) the three cams are in. This control which is maintained by switch 50 is performed through the medium of an intermediate relay 59 (FIG. 10). Similarly, a relay 60 is provided for closing the circuit to control motor 44.

Both projectors may be actuated between automatically operable and manually operable conditions, and for this purpose I provide a double-pole double-throw switch 61 for selecting as between automatic and manual control of the motion picture projector, and a triple-pole double-throw switch 62 for selecting as between automatic and manual operation of the slide projector. A main on-off switch may be provided at 63. The interconnection of these various electrical components is as shown in FIG. 10, and will be brought out in detail in tracing the various energizing and actuating circuits hereinbelow.

To now describe the operation of the apparatus, assume that the main power cord 18 is connected into an appropriate 110 volt alternating current power source, and that all of the various electrical connections between the two projectors and control unit 14 are properly made. Also, assume that main switch 63 (FIG. 10) is closed, and that the two selector switches 61 and 62 are in their upwardly actuated "Automatic" settings. Further, it may be assumed that the main switch 64 of slide projector 15 is closed, and that the slide projector is initially in a setting in which the forwardmost one of the slides 27 is in viewing position within the slide projector, and has its image projected on screen 20 by bulb 23 and the associated lens structure represented at 65 (FIG. 1).

In this condition of the apparatus, power is supplied to a first side of the projection lamp 23, and its ventilation fan motor 66 (FIG. 10), from one side of the main power cord 18, through lines 67 and 68, one side of cord 16 leading to the slide projector, and the connected line 69. Power is supplied to the other side of the projection lamp through a circuit including a line 70 leading to the movable contact 71 of relay 59, which is in engagement with the upper stationary contact 72 of this relay, from which the current flows through line 73, movable contact 74 of switch 62, a closed light cut-off switch 75, one of the lines of cord 19, and a line 76 within the slide projector. Thus, when relay 59 is in its illustrated upper position, the projection lamp 23 is energized, to project onto the screen an image of the slide which is in projection position. Fan 66 is energized even when lamp 23 is turned off, and specifically through a circuit including lines 70, 77, 78, one side of cord 16, closed switch 64, and the connected line 79. When the apparatus is in this condition, the motion picture projector 10 is de-energized, so that only the stationary slide is being projected on the screen.

When the operator desires to change to the next successive slide or motion picture sequence, he merely actuates the remote push-button switch 21. If there is a slide located in the next successive slide position within slide holder 28, such closure of remote push-button 21 by the operator acts to energize the slide change motor 24 to change to that next successive slide. Such energization of the motor is effected through the slide probe switch 34, whose probe arm or finger 30 is located to engage the edge of that next successive slide while the first slide is being projected, thus actuating the movable contact 36 of switch 34 (see FIG. 10) into engagement with stationary contact 37. The energizing circuit to slide change motor 24 is thus closed through switch 21 and contact 36 of slide probe switch 34, to thus energize line 80 connected to the right side of motor 24 in FIG. 10. The second side of the motor is of course energized through line 79, which continuously energizes fan 66. Motor 24 has associated with it a conventional limit switch or single cycle switch typically represented at 81 in FIG. 10, which switch is automatically closed by motor 24 immediately upon momentary energization of the motor, as through suitable cams or any other operating mechanism diagrammatically represented at 82, with the switch 81 being retained in closed position, to complete a second circuit to the right side of motor 24 and thus hold the motor in energized condition even after switch 21 has been opened. Actuating mechanism 82 maintains this circuit closed until the motor has completed a predetermined cycle of operation, acting to remove the first slide from its projection position and shift the next successive slide into that position. More specifically, this cycle of operation includes rightward movement of the reciprocating member 26 of FIGS. 5 and 6, to thus move the first slide out of the projection position and into its proper setting in holder 28, following which motor 24 shifts the holder 28 forwardly far enough to move the next successive slide into feeding position, after which the member 26 moves to the left to shift that slide leftwardly into its projection setting. When this operation has been completed, and member 26 is in its FIG. 6 setting, switch 81 automatically opens to halt the operation of the slide change motor 24. Thus, the second slide may now be viewed on the screen. After viewing of that slide, the operator may again press push-button switch 21, and upon each actuation of this switch the next successive slide will be advanced and projected onto the screen, so long as, on each operation, probe arm or finger 30 is in engagement with a next successive slide (as in FIG. 6) at the time of actuation of push button 21.

When the slide holder 28 reaches a position such as that shown in FIG. 7, in which the end 31 of probe arm 30 does not engage a slide, but rather projects into an unfilled space within the slide holder, then the next successive actuation of push-button 21 serves to energize the motion picture projector 10. Referring again to FIG. 10 this energization occurs as follows. Since the slide probe switch is not actuated by the presence of a slide in the next successive slide position, movable contact 36 of the switch 34 is in its leftward position of FIG. 10 to engage a contact 38 while breaking the circuit to contact 37. As a result, closure of switch 21 acts to close a circuit to coil 83 of the relay 60 which controls motor 44. This circuit extends from line 69, through switch 21, contacts 36 and 38, line 84, one of the lines of cable 19, movable contact 85 of switch 62, and the line 86 leading to the upper end of coil 83. The lower end of the coil is energized through the previously discussed line 78. Thus, coil 83 is momentarily energized, to pull the movable contact 87 of relay 60 downwardly into engagement with stationary contact 88, to in this way close a circuit from line 86 through these contacts to line 89 leading to one side of motor 44. The opposite side of the motor is already connected to line 78, so the motor is thus energized to commence rotation. Immediately upon commencement of such rotation of motor 44, cam 45 driven by the motor closes switch 48, to thereby close a holding circuit from line 68 through switch 48 to coil 83, to thereby maintain the coil in energized condition, and continue rotation of motor 44 until cam 45 opens switch 48 after completion of exactly one-half of a revolution of the three cams 45, 46 and 47. At that point switch 48 automatically opens and stops motor 44.

During this one-half revolution, the second cam 46 acts to close its associated switch 49 for a short interval sufficient to energize the slide change motor 24 of the slide projector to shift the previously viewed slide from its projection position, and advance the slide change motor through one cycle in which the unfilled slide station within the slide holder 28 is advanced to feeding position. Thus, this operation of the slide change motor does not shift any slide into projection position. The discussed circuit for energizing the slide change motor is completed from line 68 through switch 49, line 90, contact 91 of switch 62, and line 92 leading to line 80 which is connected to the slide change motor. The momentary pulse thus supplied to the slide change motor initiates its rotation, with limit switch or single cycle switch 81 automatically closing to assure completion of the desired cycle before motor 24 is again de-energized.

The discussed one-half revolution of the three cams 45, 46 and 47 acts also to automatically close an energizing circuit to motion picture projector 10, to thus commence operation of that projector. This circuit is closed by switch 50, through relay 59, whose coil 93 is connected at one side to power line 67, and is connected at its other side through line 94, switch 50, and lines 77 and 70 to the second side of the power source. Energization of coil 93 pulls movable contact 71 of relay 59 downwardly into engagement with its second contact 95, to thus close an energizing circuit from line 70 through contacts 71 and 95 to a line 96 leading to the motion picture projector. The second side of this projector is of course directly connected to the other side of the power source through line 67. In this way, a motion picture sequence is projected onto the screen by projector 10. In the position in which cam 45 stops the 180 degree rotation of the cams, upon a motion picture energizing actuation of the apparatus, switch 50 is held in its closed position, as will be apparent by reference to FIG. 11. In that figure, cam 45 acts to stop rotation of the motor 44 alternately in the two positions in which switch actuating element 51 engaged by the two lobes 54 respectively of cam 45. In one of these positions, the switch actuating element 53 associated with cam 47 is in engagement with the main cylindrical surface of cam 47, to hold switch 50 in its open position, while in the second setting of cam 45, element 53 is received within recess 58 of cam 47, to maintain switch 50 in its closed position (for operation of the motion picture projector).

The operation of the motion picture projector continues until film edge switch 36' (FIGS. 2, 3, 4 and 10) is momentarily closed by reception of its probe finger 40 within the next successive notch 43 formed in the side of the motion picture film. This momentary actuation of switch 36 energizes coil 83 of relay 60, to thus close the circuit to motor 44 and cause its rotation through another half turn of the driven cams 45, 46 and 47. This circuit is closed from line 67 through switch 36', then through movable contact 97 of switch 61, and line 98 leading to line 86. Coil 83 closes the circuit to motor 44 in the previously discussed manner, which in turn closes switch 48 for a holding period to continue rotation of the motor until the cams have turned through their second 180 degree arc. During this interval, cam 46 again closes switch 49 to advance the slide change mechanism through its next cycle, to thereby move the next successive slide into viewing position. Also, the rotation of cam 47 acts, preferably almost instantaneously upon commencement of rotation of motor 44, to open switch 50 and de-energize coil 93 of relay 59, so that movable contact 71 of this relay moves upwardly to break the circuit to the motion picture projector, and again close the circuit to projection lamp 23 of the slide projector. In this way, the motion picture projector is automatically stopped at approximately the location at which notch 43 actuates switch 36', and the next successive slide is automatically projected onto the screen. When the operator again presses remote control switch 21, the apparatus will either project the next successive slide onto the screen or show the next successive motion picture sequence by projector 10, depending upon whether the slide probe switch 34 senses that there is a slide in the next successive position within holder 28 (as seen in FIG. 6) or there is not such a slide present (as seen in FIG. 7). In this way, all that the operator is required to do is to press control switch 21 whenever he is through with a particular slide, and desires the next slide or motion picture sequence to be shown, and the apparatus automatically shows the slide and motion picture sequences in the predetermined pattern which is controlled by the arrangement of slides and vacant spaces within holder 28, and by the provision of notches 43 at the end of each motion picture sequence on the motion picture film.

It is to be understood that other types of indicia or markings may be provided on the motion picture film, in substitution for the notches 43, to determine when the end of each of the motion picture sequences has been reached. For instance, FIG. 13 represents somewhat diagrammatically a motion picture film 42a which has a small spot or area 43a formed of magnetic coating, and suitably magnetically energized to actuate a switch controlled by a readout head 40a mounted to the frame of the projector at the location of switch 36' in FIGS. 2 through 4. As will be understood, at the end of each of the sequences on film 42a there is provided one of the areas 43a, to which the head 40a responds by closure of a switch connected into the circuit of FIG. 10 at the location of film edge switch 36'.

Similarly FIG. 14 shows a motion picture film 42b which has along one of its edges an optically discernable spot 43b, typically consisting of a darkened area interrupting what is otherwise a completely transparent edge strip 143b, so that whenever the film reaches the point aat which the darkened area 43b is opposite an optical scanning system diagrammatically represented at 40b, system 40b will close a switch corresponding to that shown at 36' in FIG. 10 to stop the operation of the motion picture projector as discussed.

In actual practice, it has been found that, if the film edge switch 36' or its counterpart is located at a position such as that shown in FIG. 1, which position is passed slightly before the film reaches the actual projection location within projector 10, the apparatus may be designed to introduce a controlled delay into the system acting to bring the motion picture projector to a halt almost exactly when the notch 43 or the like reaches the projection location. This delay is partially the result of the slight delay in the operation of the cam actuated switch 50, and is partially caused by the obvious inability to halt motion picture projector 10 instantaneously when the film notch is reached. If the time is thus predetermined to stop the film notch at substantially the projection location, it is much easier, in intially editing the film, to form notch 43 or area 43a at a proper point on the film, since the notch or the like may then be located at exactly the end of the sequence to be shown, rather than at some location which is offset a predetermined distance therefrom.

FIG. 15 illustrates fragmentarily a variational form of the invention, which form may be considered as identical with that of FIGS. 1 through 12 except for the addition of a tape recorder 99 having a magnetic tape 100 which is played by the recorder to produce an audible narration describing or discussing the slides and motion pictures being projected on the screen 20. Tape 100 has signals applied thereto at the points at which it is desired to shift from one slide to a next successive slide or motion picture sequence. These signals desirably take the form of high frequency signals in the inaudible range, so that they are not head by the audience, but may be received and responded to by a sound operated switching unit 101. This unit 101 is connected into the circuit of FIG. 10 in substitution for remotely controlled switch 21 of that circuit, to energize slide change motor 24 or relay 60 in the same manner in which switch 21 has been described as energizing those elements, but at intervals determined by the emission of the inaudible high frequency signals by tape recorder 99, rather than by manual actuation of switch 21. Thus, with the FIG. 15 arrangement, the entire audio-visual presentation may be displayed completely automatically, to show a predetermined pattern of slides and motion picture sequences, all narrated audibly by the tape recorder.

If for any reason it is desired to operate the motion picture projector and slide projector manually, rather than automatically, the switches 61 and 62 are swung downwardly to their lower or manual positions, whenever it is desired to directly energize a particular one of the projectors. When switch 61 is in its lower setting, a circuit is closed directly to the motion picture projector through line 70, contact 102 of switch 61, and lines 103 and 96. Similarly, when switch 62 is in its lower position, a short circuit between contacts 37 and 38 of switch 34 is closed through movable contacts 85 and 91 of switch 62, and a jumper line 104, so that regardless of which position the slide probe switch may be in, closure of switch 21 will always energize slide change motor 24 to shift to the next successive slide.

In initially setting up the apparatus for automatic control, the motor 44 and its controlled parts may be pre-set to a desired setting by means of a manually actuated switch 105 (FIG. 10), adapted to close a circuit to relay 83 from line 67 and thereby advance motor 44 through one half a turn of its cams 45, 46 and 47, upon each closure of switch 105.

I claim:

1. Apparatus comprising slide projecting means for projecting onto a screen a series of slides received in a holder having a series of slide receiving locations, motion picture projecting means for projecting onto a screen a series of sequences from a motion picture film interspersed in a predetermined pattern with said slides, and a common interlocking control system for said two projecting means operable to shift between said two means at times to intersperse said slides and said motion picture sequences in said predetermined pattern, said control system including means responsive to the absence of a slide at one of said locations in said holder to automatically shift to said motion picture projecting means for the next sequence.

2. Apparatus comprising slide projecting means for projecting onto a screen a series of slides received in a holder having a series of slide receiving locations, motion picture projecting means for projecting onto a screen a series of sequences from a motion picture film interspersed in a predetermined pattern with said slides, and a common interlocking control system for said two projecting means operable to shift between said two means at times to intersperse said slides and said motion picture sequences in said predetermined pattern, said control system including a manually operable change unit for shifting from a first slide to a next successive slide or motion picture sequence under the control of an operator and in accordance with said predetermined pattern, and means responsive to the absence of a slide at one of said locations in said holder to automatically shift to said motion picture projecting means for the next sequence.

3. Apparatus comprising slide projecting means for projecting onto a screen a series of slides received in a holder having a series of slide receiving locations, motion picture projecting means for projecting onto a screen a series of sequences from a motion picture film interspersed in a predetermined pattern with said slides, said film having markings thereon at locations spaced approximately in correspondence with the ends of said different sequences, and a common interlocking control system for said two projecting means operable to shift between said two means at times to intersperse said slides and said motion picture sequences in said predetermined pattern, said control system including means responsive to the absence of a slide at one of said locations in said holder to automatically shift to said motion picture projecting means for the next sequence, and means responsive to said markings on the film to automatically select said slide projecting means for the next projection interval when one of said markings is reached.

4. Apparatus comprising slide projecting means for projecting onto a screen a series of slides received in a holder having a series of slide receiving locations, said slide projecting means including a reciprocable structure for moving said slides from said holder to a projection position, motion picture projecting means for projecting onto a screen a series of sequences from a motion picture film, interspersed in a predetermined pattern with said slides, and a common interlocking control system for said two projecting means operable to shift between said two means at times to intersperse said slides and said motion picture sequences in said predetermined pattern, said control system including a feeler positioned for movement by said reciprocable structure upon each actuation thereof and against a next successive slide and responsive to the absence of a slide at one of said locations in said holder to automatically shift to said motion picture projecting means for the next sequence.

5. Apparatus comprising slide projecting means for projecting onto a screen a series of slides received in a holder having a series of slide receiving locations, said slide projecting means including a reciprocable structure for moving said slides from said holder to a projection position, motion picture projecting means for projecting onto a screen a series of sequences from a motion picture film interspersed in a predetermined pattern with said slides, said film having markings thereon at locations corresponding approximatley to the ends of said different sequences, and a common interlocking control system for said two projecting means operable to shift between said two means at times to intersperse said slides and said motion picture sequences in said predetermined pattern, said control system including a feeler positioned for movement by said reciprocable structure upon each actuation thereof and against a next successive slide and responsive to the absence of a slide at one of said locations in said holder to automatically shift to said motion picture projecting means for the next sequence, and means responsive to said markings on the film to automatically select said slide projecting means for the next projection interval when one of said markings is reached.

6. Apparatus comprising a slide projecting means for projecting onto a screen a series of slides received in a holder having a series of slide receiving locations, motion picture projecting means for projecting onto a screen a series of sequences from a motion picture film interspersed in a predetermined pattern with said slides, said film having markings thereon at locations corresponding approximately to the ends of said different sequences, and a common interlocking control system for said two projecting means operable to shift between said two means at times to intersperse said slides and said motion picture sequences in said predetermined pattern, said control system including a manually operable change unit for shifting from a first slide to a next successive slide or motion picture sequence under the control of an operator and in accordance with said predetermined pattern, means responsive to the absence of a slide at one of said locations in said holder to automatically shift to said motion picture projecting means for the next sequence, and means responsive to said markings on the film to automatically select said slide projecting means for the next projection interval when one of said markings is reached.

7. Apparatus comprising slide projecting means for projecting onto a screen a series of slides received in a holder having a series of slide receiving locations, said slide projecting means including a reciprocable structure for moving said slides from said holder to a projection position, motion picture projecting means for projecting onto a screen a series of sequences from a motion picture film interspersed in a predetermined pattern with said slides, said film having markings thereon at locations corresponding approximately to the ends of said different sequences, and a common interlocking control system for said two projecting means operable to shift between said two means at times to intersperse said slides and said motion picture sequences in said predetermined pattern, said control system including a manually operable change unit for shifting from a first slide to a next successive slide or motion picture sequence under the control of an operator and in accordance with said predetermined pattern, a feeler positioned for movement by said reciprocable structure upon each actuation thereof and against a next successive slide and responsive to the absence of a slide at one of said locations in said holder to automatically shift to said motion picture projecting means for the next sequence, and means responsive to said markings on the film to automatically select said slide projecting means for the next projection interval when one of said markings is reached.

8. Apparatus comprising slide projecting means for projecting onto a screen a series of slides and including a holder having a series of locations for receiving slides and a reciprocable structure for shifting said slides to a projection position, a sensing finger movable upon shifting movement of said reciprocable structure and at a location to engage the next successive slide and responsive to the absence of a slide at one of said locations, and means actuable by said sensing finger.

9. Apparatus comprising a slide projector for projecting onto a screen a series of slides which are received within a slide holder containing a series of possible slide locations with predetermined ones of said locations vacant, a motion picture projector for projecting onto said screen individual sequences from a motion picture film which has spaced indicia representing the ends of said sequences, said slide projector including a lamp for passing light through a slide at a predetermined projection location, and including a slide change motor operable through a predetermined cycle to move one slide from said projection location and into said holder and to move a next successive slide from the holder to said projection location, a feeler switch operable to sense the presence or absence of a slide in said holder at the next successive location following a predetermined feed setting from which a slide is fed to said projection location, a control switch operable when said feeler switch senses the presence of a slide at said next successive location to energize said motor to shift from one slide to the next, a control motor actuable through a predetermined first cycle in response to actuation of said control switch when said feeler switch senses the absence of a slide at said next successive location, circuitry operable by said control motor upon actuation through said first cycle to energize said motion picture projector to project one of said sequences onto said screen, and means actuable by one of said indicia on the motion picture film, upon approximate completion of projection of one motion picture sequence, to actuate said control motor through a second cycle acting through said circuitry to de-energize said motion picture projection.

10. Apparatus comprising a slide projector for projecting onto a screen a series of slides which are received within a slide holder containing a series of possible slide locations with predetermined ones of said locations vacant, a motion picture projector for projecting onto said screen individual sequences from a motion picture film which has spaced indicia representing the ends of said sequences, said slide projector including a lamp for passing light through a slide at a predetermined projection location, and including a slide change motor operable through a predetermined cycle to move one slide from said projection location and into said holder and to move a next successive slide from the holder to said projection location, a feeler switch operable to sense the presence or absence of a slide in said holder at the next successive location following a predetermined feed setting from which a slide is fed to said projection location, a control switch operable when said feeler switch senses the presence of a slide at said next successive location to energize said motor to shift from one slide to the next, a control motor actuable through a predetermined first cycle in response to actuation of said control switch when said feeler switch senses the absence of a slide at said next successive location, circuitry operable by said control motor upon actuation through said first cycle to de-energize said lamp and energize said motion picture projector to project one of said sequences onto said screen, a switching circuit actuatable by said control motor upon actuation thereof through said first cycle to energize said slide change motor for one cycle thereof, a probe switch circuit actuable by one of said indicia on said film, upon approximate completion of one motion picture sequence, to actuate said control motor through a second cycle acting, through said circuitry and said switching circuit, to de-energize said motion picture projector and re-energize said lamp and to energize said slide change motor for a cycle thereof.

11. Apparatus as recited in claim 10, in which said circuitry includes a first switch cam actuable by said control motor to energize and de-energize said lamp and said motion picture projector as recited, said switching circuit including a second switch which is cam actuated by said control motor upon each of said first and second cycles, and there being a third cam actuated switch operated by said control motor to close a holding circuit continuing rotation of the control motor until completion of one of said first and second cycles.

12. Apparatus comprising slide projecting means for projecting onto a screen a series of slides, motion picture projecting means for projecting onto a screen a series of sequences from a motion picture film interspersed in a predetermined pattern with said slides, and a common interlocking control system for said two projecting means operable to shift between said two means at times to intersperse said slides and said motion picture sequences in said predetermined pattern, said control system including cycle initiating means for producing a series of identical signals for commencing a series of sequential actuations respectively of said two projecting means, and pattern control means operable to be preset to any of different display patterns prior to production of said series of identical signals by said cycle initiating means and then operable automatically and without further selection control by an operator to cause different responses to different ones of said identical signals, in a relation actuating said slide projecting means to automatically project a next successive slide in response to certain of said signals, and actuating said motion picture projecting means to automatically project a next successive motion picture sequence in response to others of said identical signals, in accordance with the selected pattern.

13. Apparatus as recited in claim 12, in which said cycle initiating means include a manually actuable control switch operable to produce a series of electrical signals, which are identical but to which said two projecting means respond differently under the control of said pattern control means 14. Apparatus as recited in claim 12, in which said cycle initiating means include a sound unit for producing sound simultaneously with the projection of said slides and operable to play a recording carrying spaced triggering means and responsive to said triggering means to produce said series of identical signals.

15. Apparatus as recited in claim 12, in which said cycle initiating means include a sound unit for producing sound simultaneously with the projection of said slides and operable to play a recording carrying spaced triggering means and responsive to said triggering means to produce said series of identical signals in the form of high frequency inaudible acoustic signals, said pattern control means including an acoustically actuated switching unit responsive to said acoustic signals.

16. Apparatus as recited in claim 12, in which said pattern control means include means responsive to the completion of one of said motion picture sequences but not said entire film to automatically select said slide projection means for the next projection interval.

17. Apparatus as recited in claim 12, in which said film has markings formed thereon at locations spaced approximately in correspondence with the ends of said different sequences, said pattern control means being responsive to said markings on the film to automatically select said slide projecting means for the next projection interval when one of said markings is reached.

References Cited by the Examiner

UNITED STATES PATENTS

| | | | |
|---|---|---|---|
| 2,966,094 | 12/1960 | Miller | 352—6 |
| 3,139,793 | 7/1964 | Bradford et al. | 88—28 |
| 3,146,667 | 9/1964 | Mulch | 88—28 |
| 3,180,212 | 4/1965 | Hillegonds et al. | 88—28 |
| 3,181,421 | 5/1965 | Nimke et al. | 88—28 |
| 3,202,044 | 8/1965 | Harris | 352—133 X |

JULIA E. COINER, *Primary Examiner.*

NORTON ANSHER, *Examiner.*

V. A. SMITH, H. H. FLANDERS, *Assistant Examiners.*